United States Patent [19]

Locatelli et al.

[11] 4,260,539

[45] Apr. 7, 1981

[54] POLYPROPYLENE/GLASS FIBER/IMIDO PREPOLYMER BASED COMPOSITIONS

[75] Inventors: Jean-Louis Locatelli, Vienne; Louis Macabrey, Mitry-Le Neuf, both of France

[73] Assignee: Rhone-Poulenc Industries, Paris, France

[21] Appl. No.: 961,769

[22] Filed: Nov. 17, 1978

[30] Foreign Application Priority Data

Nov. 18, 1977 [FR] France ................................ 77 34685
Jun. 30, 1978 [FR] France ................................ 78 19586

[51] Int. Cl.³ .............................................. C08K 9/00
[52] U.S. Cl. ............................ 260/42.14; 260/42.18; 260/42.37; 260/42.45; 260/42.56; 264/176 R
[58] Field of Search ............... 260/42.14, 42.18, 42.37, 260/42.45, 42.56

[56] References Cited

U.S. PATENT DOCUMENTS

| | | | |
|---|---|---|---|
| 3,853,808 | 12/1974 | Kishikawa et al. | 260/42.18 |
| 4,056,505 | 11/1977 | Taylor et al. | 260/42.18 |
| 4,111,919 | 9/1978 | Gruffaz et al. | 521/147 |

FOREIGN PATENT DOCUMENTS 1516445  7/1978  United Kingdom .

OTHER PUBLICATIONS

Handbook of Reinforced Plastics, Oleesky et al., Reinhold Publ. Co., N.Y., (1964), pp. 120 to 123.

*Primary Examiner*—Melvyn I. Marquis
*Attorney, Agent, or Firm*—Burns, Doane, Swecker & Mathis

[57] ABSTRACT

A molding composition is comprised of (A) polypropylene, (B) glass fibers and (C) an imido/NVP, or imido/NVP/polyester prepolymer, and is useful for the fabrication of a variety of shaped articles, especially for the automotive industry [e.g., radiators, battery casings, fans, etc.].

17 Claims, No Drawings

POLYPROPYLENE/GLASS FIBER/IMIDO PREPOLYMER BASED COMPOSITIONS

BACKGROUND OF THE INVENTION

1. Field of the Invention

The present invention relates to novel compositions of matter based on polypropylene and glass fibers.

2. Description of the Prior Art

It is known in this art to improve the mechanical properties of thermoplastic polymers by incorporating glass fibers therein. However, such a combination entails problems of adherence of the glass fibers to the polymer, and to combat same, and when the polymer is polypropylene, U.S. Pat. No. 3,853,808, for example, specifies the admixture of a certain amount of bis-maleimide to the polypropylene, followed by formulation into a composition also including the glass fibers.

SUMMARY OF THE INVENTION

Novel compositions are now provided, useful for the same purposes and designed to obviate the same problems, comprising (A) polypropylene and (B) glass fibers, such compositions being characterized in that they also include a prepolymer (C) obtained by the reaction of:

(i) a polyimide having the structural formula:

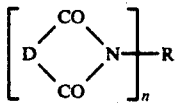

wherein D represents:

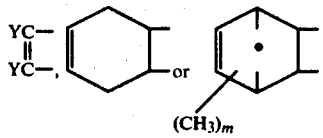

wherein Y represents H, $CH_3$ or Cl and m is 0, 1 or 2, R represents an organic radical of valence n containing 2 to 50 carbon atoms, and m is a number having an average value of from 2 to 5, with (ii) N-vinyl-2-pyrrolidone, optionally also with (iii) an unsaturated polyester.

The above prepolymer (C) preferably has a softening point of between 30 and 220° C.

DETAILED DESCRIPTION OF THE INVENTION

More particularly, in the subject compositions the proportion by weight of the prepolymer (C) generally is 0.01 to 10%, and preferably 0.1 to 5%, of the weight of the mixture of the polypropylene and the glass fibers, with the proportion of the latter being 1 to 50%, and preferably 10 to 40%, of the weight of the mixture of the polypropylene and the glass fibers. The polypropylene employed in these compositions may be selected from among any of the several different varieties of crystalline polypropylenes containing at least 50% by weight isotactic component. The polypropylene preferably has a fluidity index between 0.2 and 15 (measured by the method described in the ASTM standard 1238-72, at a temperature of 230° C. and under a load of 2.10 kg), and a molecular weight between 250,000 and 700,000.

Such polymers may be prepared by known catalytic methods, such as the typical known processes of Ziegler-Natta type.

The polypropylenes may consist of homopolymers of propylene, or of propylene/ethylene copolymers which preferably contain up to 10% by weight of polymerized ethylene. Among such copolymers, preference is given to sequential copolymers containing polypropylene chains and elastomeric chains, themselves consisting of a propylene/ethylene copolymer, in which the proportion of the ethylene may be up to 30% by weight.

The compositions according to the invention contain glass fibers (B). The amount of glass fibers preferably represents 10 to 40% by weight of the mixture of the polypropylene+glass fibers. The fibers preferably have lengths between $100\mu$ and 12 mm, the diameters of the individual fibers generally being between 2 and $20\mu$. Preference is given to fibers of Type E [as defined in "Handbook of Reinforced Plastics"-Ed. 1964, p. 120], whereby their gauge (weight per kilometer of filament) may vary between 600 and 2500 dtex. Although the fibers of the E type are considered particularly suitable for the intended applications of the compositions of the invention, other fibers may also be used, either exclusively or in combination with E type fibers. The aforesaid text indicates (pages 121-122) examples of such fibers, and same is hereby expressly incorporated by reference.

Generally, the fibers used in the invention are treated fibers. On the one hand, the fibers may be bundled by use of a binder. As examples of such binders, polyvinyl acetate, copolymers of ethylene and acrylic esters, epoxy resins, polyethers and aromatic polyesters, are mentioned.

On the other hand, the fibers may be treated with a sizing or complexing agent, such as, for example, organosilicon compounds, such as vinyl-tri(ethoxymethoxy)silane, γ-aminopropyltriethoxysilane, [(amino-2-ethylamino)-3-propyl] trimethoxysilane, vinyl(methacryloyl)trimethoxysilane, or compounds such as the complexes of chromium with methacrylic acid.

The characteristic component of the compositions according to the invention comprises the reaction product of:

(i) a polyimide having the structural formula

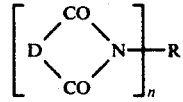

wherein D, n and R are as above define, with (ii) N-vinyl-2-pyrrolidone, and optionally with (iii) an unsaturated polyester.

The polyimide is preferably a bis-imide having the structural formula:

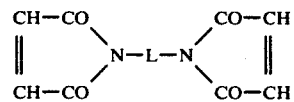

wherein the symbol L represents a divalent radical selected from the group consisting of cyclohexylene, phenylene, and a radical having the structural formula:

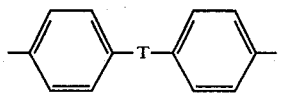

wherein T represents —CH$_2$—, —C(CH$_3$)$_2$—, —O— or SO$_2$. Among the bis-maleimides corresponding to the above formula and the definition noted with respect thereto, N,N',4,4'-diphenylmethane bis-maleimide is most preferred.

The polyimide and the N-vinyl-2-pyrrolidone are employed in amounts such that n$_1$ designates the number of carbon-carbon double bonds introduced by the polyimide and n$_2$ the number of —CH=CH$_2$ groups contributed by the N-vinyl-2-pyrrolidone, the n$_1$/n$_2$ ratio being between 1.01 and 10.

The unsaturated polyesters which may be used in the invention are in and of themselves well known. They are typically prepared by polycondensation of polycarboxylic derivatives and polyols; the term "polycarboxylic derivative" connotes acids, esters of lower alcohols, acid chlorides, and even the anhydrides. Among the monomers subjected to polycondensation, at least one displays olefinic unsaturation. In the compositions of the invention, essentially polyesters are employed, wherein the initial unsaturated monomers are diacids or dianhydrides having an α,β-olefinic double bond. As examples, the carboxylic derivatives may be of maleic, chloromaleic, itaconic, citraconic, aconitic, pyrocinchonic, fumaric, chlorendic, endomethylenetetrahydrophthalic, tetrahydrophthalic, ethylmaleic, succinic, sebacic, phthalic, isophthalic, adipic, or hexahydrophthalic type. Among the polyols, the most typical are ethylene glycol, propylene glycol, diethylene glycol, triethylene glycol, neopentyl glycol, tetraethylene glycol, tetraethylene glycol, butylene glycol, dipropylene glycol, glycerol, trimethylol propane, pentaerythrytol, sorbitol, bis(hydroxymethyl)-3,3-cyclohexane, tris(β-hydroxymethyl) isocyanurate.

The unsaturated polyesters may be prepared by known methods [for example, see KIRK-OTHMER, "Encyclopedia of Chemical Technology", 2nd edition, Vol. 20]. The molecular weight of the polyesters employed is generally between 1000 and 10,000.

The expression "unsaturated polyester" as used herein connotes both the polycondensates described hereinabove, and solutions of said polycondensates in polymerizable monomers. The liquid polymerizable monomers may be, for example, hydrocarbons (styrene, vinyltoluene, divinylbenzene), ethers (oxide of vinyl and chloro-2-ethyl), derivatives of acrylic or methacrylic acid, or allylic compounds.

The N-vinyl-2-pyrrolidone is also known as being a monomeric solvent for the unsaturated polyesters. It should, therefore, be understood that if an unsaturated polyester is used, it may logically be utilized in the form of a solution in a polymerizable monomer, with the understanding that the prepolymers according to the invention must always be prepared from N-vinyl-2-pyrrolidone. When used, the polymerizable monomer may represent 10 to 60% by weight of the solution of the unsaturated polyester. In the compositions of the invention, the weight of the polyester or of the solution as defined hereinabove is preferably 5 to 60% by weight of the total of the polyimide+N-vinyl-2-pyrrolidone. The preparation of the prepolymers from the polyimide, N-vinyl-2-pyrrolidone, and, optionally, the unsaturated polyester, is described hereinafter.

The compositions according to the invention may also include a catalyst. The catalyst is preferably selected from the group consisting of:

(1) thiuram sulfides of the structural formula:

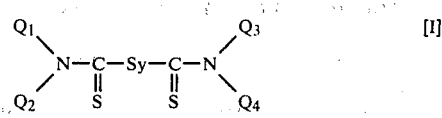

wherein y is equal to 1, 2 or 4, Q$_1$, Q$_2$, Q$_3$ and Q$_4$, which may be identical or different, represent an alkyl radical containing 1 to 4 carbon atoms, Q$_1$ and Q$_2$, or Q$_3$ and Q$_4$ may together form a divalent radical of the formula —(CH$_2$)$_v$—, wherein v is equal to 5 or 6, one or two of the radicals Q$_1$, Q$_2$, Q$_3$ and Q$_4$ also can be phenyl radicals, and (2) mercaptothiazoles of the structural formula:

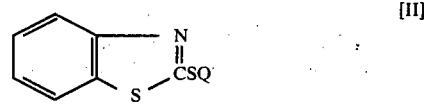

wherein Q represents a hydrogen atom, a —NR'R" group, wherein R' may be a hydrogen atom, R' and R" may represent an alkyl radical containing 1 to 8 carbon atoms, a cyclohexyl radical, R' and R" also being able to together form, with the nitrogen atom of the —NR'R" group, morpholino, while the radical Q may also represent a group of the structural formula:

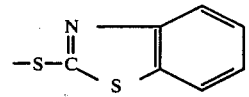

Illustrative of the compounds of the above formulae I and II, there are noted:
Tetramethylthiuram monosulfide;
Tetrabutylthiuram monosulfide;
Tetramethylthiuram disulfide;
Tetraethylthiuram disulfide;
Bis-(cyclopentamethylene)thiuram tetrasulfide;
Dimethyldiphenylthiuram disulfide;
Dibenzothiazyl disulfide;
(N-t.butyl)benzothiazyl-2-sulfenamide;
(N-cyclohexyl)benzothiazyl-2-sulfenamide;
(N,N-dicyclohexyl)benzothiazyl-2-sulfenamide;
(N,N-diisopropyl)benzothiazyl-2-sulfenamide;
(N-oxydiethylene)benzothiazyl-2-sulfenamide; and
(Benzothiazyl-2)dimethyl-2',6'-morpholino-4-sulfide.

The amount of the sulfide catalyst, such as defined above, is conveniently from 1 to 25% by weight of the prepolymer.

It should also be understood that the compositions are defined by their essential components, but it is also within the scope of the invention to incorporate certain additives, such as, for example, fillers (talc, mica, lithopone, diamond carbon fibers, quartz, ceramics), pigments, lubricants, flame retardants, stabilizers, etc.

The compositions according to the invention may be formulated by the simple mixing of the several components. According to a preferred method, the operation is performed in two stages: first, the polypropylene, the prepolymer and optionally the sulfide compound are mixed together; then, following homogenization of the mixture, the glass fibers are introduced while continuing the homogenization operation.

When a sulfide compound is used, a masterbatch of the polypropylene and the sulfide compound may be prepared, then part or all of the masterbatch may be mixed with the amounts of polypropylene and the prepolymer desired, and finally, after homogenizing the entire mixture, the glass fibers may be introduced into said mixture. These operations are typically performed at ambient temperature (15° to 30° C.). The composition prepared in this manner may subsequently be directly molded by compression at a temperature between 180° and 360° C. under a pressure of 100 to 400 bars, or same may be extruded at a temperature between 180° and 260° C., then granulated and molded by compression or injection molding at a temperature of from 180° to 260° C. and under a pressure between 200 and 1500 bars. The second method is usually employed because of ease of operation.

The compositions according to the invention are particularly suitable for the manufacture of items used in the automotive industry (radiators, battery casings, fans), and for the manufacture of machining blanks replacing light alloys.

The articles prepared from compositions according to the invention possess a plurality of interesting properties. They are particularly remarkable with respect to tensile and bending strength, impact strength at low temperatures, creep resistance and resistance to fire.

In order to further illustrate the present invention and the advantages thereof, the following specific examples are given, it being understood that same are intended only as illustrative and in nowise limitative.

In the said examples which follow the products and tests are the following:

Polypropylene (polymer $A_1$ in the table): polypropylene, 95% isotactic and having a fluidity index of 5 (ASTM standard 1238-72 under the conditions indicated hereinabove) and a molecular weight of 320,000. Polypropylene copolymer (polymer $A_2$): sequential polypropylene copolymer with elastomeric segments, said segments consisting of copolymer of propylene and ethylene (70/30 by weight), the copolymer containing a total of 90% by weight of propylene and 10% by weight of ethylene. This copolymer had a fluidity index of 3.5 and an average molecular weight of 360,000.

Prepolymer $P_1$: this copolymer had a softening point of 71° C. It was prepared as follows:

At 120° C., 75 parts (by weight) of N,N',4,4'-diphenylmethane bis-maleimide, 12.5 parts of N-vinyl-2-pyrrolidone and 12.5 parts of a solution consisting of 40% by weight of diallyl phthalate and 60% of an unsaturated polyester obtained from maleic acid, propylene and ethylene glycol, were mixed together. The molecular weight of the polyester was 2000. The product obtained was then maintained for 35 minutes at 140° C.

Prepolymer $P_2$: this polymer had a softening point of 87° C. It was prepared as follows:

At 120° C., 60 parts (by weight) of N,N',4,4'-diphenylmethane bis-maleimide and 40 parts of N-vinyl-2-pyrrolidone were mixed together.

The product obtained was maintained for 30 minutes at 130° C.

Prepolymer $P_3$: this prepolymer had a softening point of 190° C. It was prepared as prepolymer $P_2$, but was maintained for 30 minutes at 150° C.

Glass fibers: E type glass fibers having the following properties:

$B_A$ fibers:
  average length 6 mm
  binder: aromatic polyether
  coupling agent: aminopropyltriethoxysilane $B_2$ fibers:
  average length 6 mm
  binder: aromatic polyether
  coupling agent: a chromium complex Tests:

Bending strength (ASTM standard D 790-63)

CHARPY impact strength (ASTM standard D 256-56)

Creep rate in tension at 80° C. under a load of 106.3 daN/cm².

IZOD impact strength NFT standard 51017-unnotched specimen.

EXAMPLE 1

The following mixture was homogenized on a roll mixer for one minute (by weight):

70 parts polypropylene in powder form (the $A_1$ polymer noted above);

1 part of the prepolymer $P_1$; and 30 parts of glass fibers $B_1$

The mixture was extruded at 210° C. in a single screw extruder and the resultant bar extrudate was granulated.

Molded shaped articles were then prepared from the granules, by injection molding at 240° C. by means of an injection press (Pressure: 1350 bars—counter pressure 150 bars).

The characteristic properties of the shaped articles were determined and are reported in Table 1.

EXAMPLES 2 TO 5

The different tests were performed by the process described in Example 1, but by varying the nature of the components of the composition and the quantity of the prepolymer $P_1$ as reflected in Table 1. The amounts of the glass fibers and of the polypropylene were those specified in Example 1.

The different properties were measured and are compiled in Table 1.

TABLE I

| Examples | Nature of the Polymer | Nature of the Glass Fiber | Proportion of the Polyimide Prepolymer (C) % * | Impact Strength Kgcm/cm³ (CHARPY) | Bending Strength MPa | Bending Modulus MPa | Tensile Strength MPa | Creep Rate in μ/h |
|---|---|---|---|---|---|---|---|---|
| Control | $A_1$ | $B_1$ | 0 | 4.2 | 80.5 | 4700 | 52 | 15.0 |
| 1 | $A_1$ | $B_1$ | 1 | 13.22 | 119.3 | 4710 | 70.1 | 1.38 |
| 2 | $A_1$ | $B_2$ | 1 | 11.58 | 121.6 | 4853 | 72.2 | 1.13 |
| 3 | $A_1$ | $B_1$ | 0.30 | 10.9 | 117.3 | 4910 | 69.2 | 1.25 |
| 4 | $A_2$ | $B_1$ | 1 | 14.12 | 119.3 | 4951 | 66.5 | |

TABLE I-continued

| Examples | Nature of the Polymer | Nature of the Glass Fiber | Proportion of the Polyimide Prepolymer (C) % * | Impact Strength Kgcm/cm³ (CHARPY) | Bending Strength MPa | Bending Modulus MPa | Tensile Strength MPa | Creep Rate in μ/h |
|---|---|---|---|---|---|---|---|---|
| 5 | $A_2$ | $B_2$ | 1 | 12 | 112.9 | 4239 | 68.1 | 1.88 |

*per 100 parts of the polypropylene mixture + glass fibers

EXAMPLE 6

A masterbatch consisting of 98 parts of polypropylene and 2 parts of dibenzothiazyl disulfide was prepared.

To 10 parts of the above masterbatch, 59 parts of the polypropylene and 1 part of the prepolymer $P_1$ were added.

The mixture was homogenized for 15 minutes on rolls and then 30 parts of the glass fibers were added.

The composition was introduced in a single screw extruder (screw diameter: 20 mm, length of screw: 400 mm; compression ratio: 3.5; diameter of die: 3 mm). The extrusion was pereformed with a temperature gradient of 240° to 220° C. (die) and at a rate of 20 t/mn.

The granules obtained by cutting the bar extrudates, at the outlet of the extruder, were injection molded by means of an injection press at 220° C. under 300 bars.

EXAMPLE 7

The test of Example 6 was repeated by using 1 part of diebenzothiazyl disulfide and 99 parts of polypropylene for the preparation of the masterbatch.

EXAMPLE 8

The test of Example 7 was repeated by replacing the prepolymer $P_1$ by an identical quantity of the prepolymer $P_2$.

EXAMPLE 9

The test of Example 7 was repeated by replacing the prepolymer $P_1$ by an identical quantity of the prepolymer $P_3$.

EXAMPLE 10

The test of Example 6 was repeated by replacing the dibenzothiazyl with the same amount of tetramethylthiuram.

TABLE 2

| Example | Prepolymer | Bending Strength At 25° C. (kg/mm²) | Bending Modulus at 25° C. (kg/mm²) | IZOD Impact Strength (kg · cm/cm³) |
|---|---|---|---|---|
| 6 | $P_1$ | 12.5 | 265.8 | 38 |
| 7 | $P_1$ | 14 | 313.1 | 51.4 |
| 8 | $P_2$ | 14.1 | 299 | 39.1 |
| 9 | $P_3$ | 12.6 | 280 | 27.9 |
| 10 | $P_1$ | 12.8 | 285 | 40.5 |

While the invention has now been described in terms of various preferred embodiments and illustrated with respect to certain examples, it will be apparent to the skilled artisan that various omissions, substitutions, modifications and the like may be made without departing from the spirit of the invention. Accordingly, it is intended that the scope of the present invention be limited only by the following claims.

What is claimed is:

1. A composition of matter comprising (A) polypropylene, (B) glass fibers, and (C) a prepolymer which comprises the reaction product of (i) a polyimide of the structural formula:

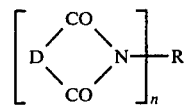

in which D is:

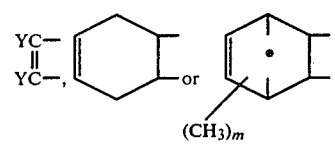

wherein Y is H, $CH_3$ or Cl, and m is 0, 1 or 2, R is an organic radical of valence n, containing 2 to 50 carbon atoms, and n is a number with an average value of from 2 to 5, with (ii) N-vinyl-2-pyrrolidone.

2. The composition of matter as defined by claim 1, wherein the prepolymer (C) comprises the reaction product of the polyimide (i) with the N-vinyl-2-pyrrolidone (ii) and with an olefinically unsaturated polyester (iii).

3. The composition of matter as defined by claims 1 or 2, wherein the proportion by weight of the prepolymer (C) is from 0.01 to 10% by weight of the total weight of the polypropylene/glass fiber mixture, the proportion by weight of said glass fibers ranging from 1 to 50% of said mixture.

4. The composition of matter as defined by claim 3, wherein the polypropylene is a crystalline polypropylene, being at least 50% by weight isotactic and having an index of fluidity of from 0.2 to 15 and a molecular weight of from 250,000 to 700,000.

5. The composition of matter as defined by claim 4, wherein the polypropylene is selected from the group comprising the homopolymers of propylene and the copolymers of propylene and ethylene containing up to 10% by weight of polymerized ethylene.

6. The composition of matter as defined by claims 1 or 2, wherein the prepolymer (C) has a softening point of from 30° to 220° C.

7. The composition of matter as defined by claims 1 or 2, wherein the polyimide comprising the prepoiymer (C) is N,N',4,4'-diphenylmethane bis-maleimide.

8. The composition of matter as defined by claims 1 or 2, wherein the prepolymer, the polyimide and N-vinyl-2-pyrrolidone have been reacted in amounts such that when $n_1$ designates the number of carbon-carbon double bonds contributed by the polyimide and $n_2$ the number of $-CH=CH_2$ groups contributed by the N-vinyl-2-pyrrolidone, the $n_1/n_2$ ratio is between 1.01 and 10.

9. The composition of matter as defined by claim 2, wherein the prepolymerization reaction, the unsaturated polyester or a solution of the unsaturated polyester in a polymerizable monomer, is added to the polyimide and the N-vinyl-2-pyrrolidone.

10. The composition of matter as defined by claim 9, wherein the amount of unsaturated polyester or solution of the unsaturated polyester constitutes 5 to 60% by weight of the total weight of the polyimide plus N-vinyl-2-pyrrolidone.

11. The composition of matter as defined by claims 1 or 2, further comprising a sulfide catalyst selected from the group consisting of thiuram sulfides of the structural formula:

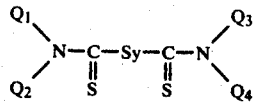     [I]

wherein y is 1, 2 or 4, $Q_1$, $Q_2$, $Q_3$ and $Q_4$, which may be identical or different, represent an alkyl radical containing 1 to 4 carbon atoms, $Q_1$ and $Q_2$, or $Q_3$ and $Q_4$ may together form a divalent radical having the formula $-(CH_2)_v-$, wherein v is equal to 5 or 6, and one or two of the radicals $Q_1$, $Q_2$, $Q_3$ and $Q_4$ can also be phenyl, and mercaptothiazoles of the structural formula:

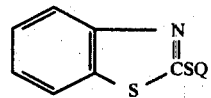     [II]

wherein Q is hydrogen, —NR′R″ wherein R′ can be hydrogen, R′ and R″ can be an alkyl radical containing 1 to 8 carbon atoms, a cyclohexyl radical, and R′ and R″ can form, together with the nitrogen atom of the —NR′R″ group, morpholino, and Q can also be a group of the formula:

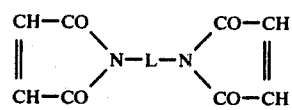

12. The composition of matter as defined by claim 11 wherein the amount of weight of the sulfide compound is 1 to 25% of the total weight of the prepolymer.

13. The composition of matter as defined by claim 11, wherein the sulfide compound is dibenzothiazyl disulfide.

14. The composition of matter as defined by claims 1 or 2, the glass fibers being bundled.

15. The composition of matter as defined by claims 1 or 2, the glass fibers having been treated with either a sizing or complexing agent.

16. A shaped article comprising the composition of matter as defined by claims 1 or 2.

17. A molded shaped article comprising the composition of matter of claims 1 or 2.

* * * * *